United States Patent [19]

Zacharias

[11] 4,251,903
[45] Feb. 24, 1981

[54] TURNING AND/OR GRINDING MACHINES

[75] Inventor: Theodor Zacharias, Meerbusch, Fed. Rep. of Germany

[73] Assignee: Kocks Technik GmbH & Co., Dusseldorf, Fed. Rep. of Germany

[21] Appl. No.: 27,918

[22] Filed: Apr. 6, 1979

[30] Foreign Application Priority Data

Apr. 14, 1978 [DE] Fed. Rep. of Germany ....... 2816220

[51] Int. Cl.³ ........................... B23C 3/04; B24B 5/04
[52] U.S. Cl. ..................................... 29/28; 51/289 R; 72/238
[58] Field of Search ............. 29/28; 51/105 R, 289 R; 72/224, 238

[56] References Cited

U.S. PATENT DOCUMENTS

| 2,579,391 | 12/1951 | Minarik et al. | 51/289 R X |
| 2,934,862 | 5/1960 | Fechter | 51/289 R X |
| 3,555,745 | 1/1971 | Ueda | 51/289 R |
| 4,030,332 | 6/1977 | Koch et al. | 72/238 X |

Primary Examiner—Z. R. Bilinsky
Attorney, Agent, or Firm—Buell, Blenko, Ziesenheim & Beck

[57] ABSTRACT

A roll turning or grinding machine is provided adapted to receive a multi-roll stand, such as a four-roll stand whose rolls are to be machined or ground by means of a tool, the roll stand being not provided with a drive shaft for the rolls whereby the rolls rotate freely or idly during a rolling operation, said machine having gear wheels journalled in a support and driven by a motor and engaging counter-wheels attached to the rolls for driving the rolls to machine them or while they are being ground.

14 Claims, 3 Drawing Figures

TURNING AND/OR GRINDING MACHINES

This invention relates to roll turning and/or grinding machines for the finishing or working-in of the sizing pass contour in working rolls of multi-roll stands, such as stands having three or more, preferably four rolls per sizing pass.

In roll stands having only two rolls per sizing pass, the rolls, since they are usually over-hung mounted, are removed from the roll stand for the purpose of finishing or working-in the sizing pass contour and are only machined on turning or grinding machines suitable for this purpose. It is a more expensive matter to remove the rolls in the case of roll stands having three or more rolls per sizing pass: therefore, as far as possible, the rolls are machined in the roll stand, that is to say in a state ready for operation.

The rolls have to be driven in order that they may be machined. This is relatively less problematical in the case of roll stands for stretch-reducing rolling mills having three rolls per sizing pass, since at least one drive shaft is provided which drives all three rolls by way of bevel gears. However, in the case of non-driven roll stands for push benches, or in the case of roll stands having four and more rolls per sizing pass, in which usually only some of the rolls, for example two rolls are driven by a drive shaft and the other rolls are not driven during normal operation but rotate freely, the machining of the non-driven rolls of the relevant sizing pass causes problems. Although attempts have been made, by means of auxiliary bevel gears and additional transmission shafts within the stands, to provide the possibility of rendering the rolls, which are normally non-driven during the rolling operation drivable at least during the finishing or working-in of the sizing pass contour, this is only possible in stands which are sufficiently large and thus offer the space required for the auxiliary drives. In the case of roll stands which are too small for this purpose, attempts have been made to drive the rolls by means of friction wheels, the latter being pressed against the working surfaces of the rolls. This has the disadvantage that the transmissible torque remains relatively small and consequently the sizing passes can only be machined by grinding, which takes a considerably longer period of time than machining by turning. A disadvantage in the use of friction wheels is that the working surfaces of the rolls act as friction surfaces, so that the friction wheels leave marks on the working surfaces.

An object of the invention is to provide a roll turning machine or roll grinding machine by means of which it is possible to finish or work-in sizing pass contours even in rolls which are not driven during normal operation, and without having to remove the rolls from their roll stands for this purpose.

In accordance with the invention, a roll turning or grinding machine for the finishing or working-in of the sizing pass contour in working rolls of multi-roll stands, comprises means for supporting and clamping a roll stand having ready fitted thereon the rolls which require machining and/or grinding, motor-driven gear wheels arranged to mesh with counter-gear wheels arranged laterally of and adjacent to rolls for which the stand is not provided with a drive shaft, such counter-gear wheels being non-rotatable relative to their respective rolls, and a tool support for adjustably supporting turning or grinding tools to bring the latter into engagement with the roll peripheries to be machined or ground.

Thus, all the rolls of the relevant sizing pass can be driven with a relatively large torque, so that, in addition to a grinding operation, it is also possible to perform the substantially more rapid and more economic turning operation. All the rolls can then be machined simultaneously, this not only being rational, but also of considerable importance for the purpose of obtaining a symmetrical sizing pass contour. Furthermore, all the disadvantages associated with the friction wheels are avoided, so that satisfactory working faces can be obtained on the rolls. Also, the construction in accordance with the invention is suitable for small as well as for large roll stands, and, moreover, an optional number of rolls can be chosen for each sizing pass.

In general, it is advantageous if the gear wheels have spur teeth. In contrast to bevel gears, gear wheels of this type are relatively narrow and require less space in an axial direction. Furthermore, incorrect distances between the gear axes have been less effective and it is more simple to manufacture the teeth.

In a preferred embodiment of the invention, the motor-driven gear wheels of the machine are arranged at that side of the roll stand which remote from the tool support. This has the advantage that sufficient space is available for the tool support and also for the roll drive, so that no difficulties with respect to space arise even in the case of very small roll stands. Furthermore, the roll stand protects the motor-driven gear wheels from swarf, the grit from the grinding wheel, and the cooling fluid in the region of the tool support.

It is particularly advisable to mount the motor-driven gear wheels in a drive support which is adjustable relative to the clamped roll stand. With a support of this type, the drive gear wheels can be meshed in a simple manner with the counter-wheels of the roll stand as soon as the latter has been clamped in the machine. The distances between the axes of the gear wheels and counter-wheels can be complied with at low expense, even when they change in the case of differing roll diameters and sizes of stand.

It has proved to be particularly advantageous for the machine to have for each roll two associated driven gear wheels which mesh with the counter-wheels located one at each end of the respective roll. Thus, a greater overall width of the teeth is obtained, thus permitting the transmission of a larger torque without having to increase the axial distance between the bearings for the rolls and the center of the rolls at one end of the rolls.

In a further development of the invention, the gear wheels are driven by a drive unit which is displaceably arranged and which is also selectively usable for driving the drive shafts of the roll stands. In such an embodiment of the machine in accordance with the invention, it is possible, on the one hand, to machine roll stands provided with rolls which are not driven during the rolling operation, and, on the other hand, to machine roll stands in which all the rolls are drivable by a drive shaft. In the first-mentioned roll stands, the drive unit is associated with the drive support and its gear wheels in order to be able to drive the rolls which are not driven during the rolling operation, whilst the adjustable drive support and its gear wheels can be omitted in the case of the second-mentioned roll stands, and the drive unit drives the drive shaft, also used during the rolling operation, of the clamped roll stand. A roll stand, which rolls with non-driven as well as with driven rolls, can be driven in a two-fold manner during finishing, namely by driving, by means of the gear wheels of the drive support, the rolls which rotate idly during the rolling operation as well as the rolls which are driven during the rolling operation, or only the rolls which are not driven during normal rolling operation are thus driven during the finishing operation, while the other rolls are driven by the drive shaft in the same manner as during the rolling operation, although, for this purpose, a separate drive unit has to be provided in the machine in accordance with the invention.

One embodiment of the invention is further described, by way of example, with reference to the drawings, in which.

Figure 1:
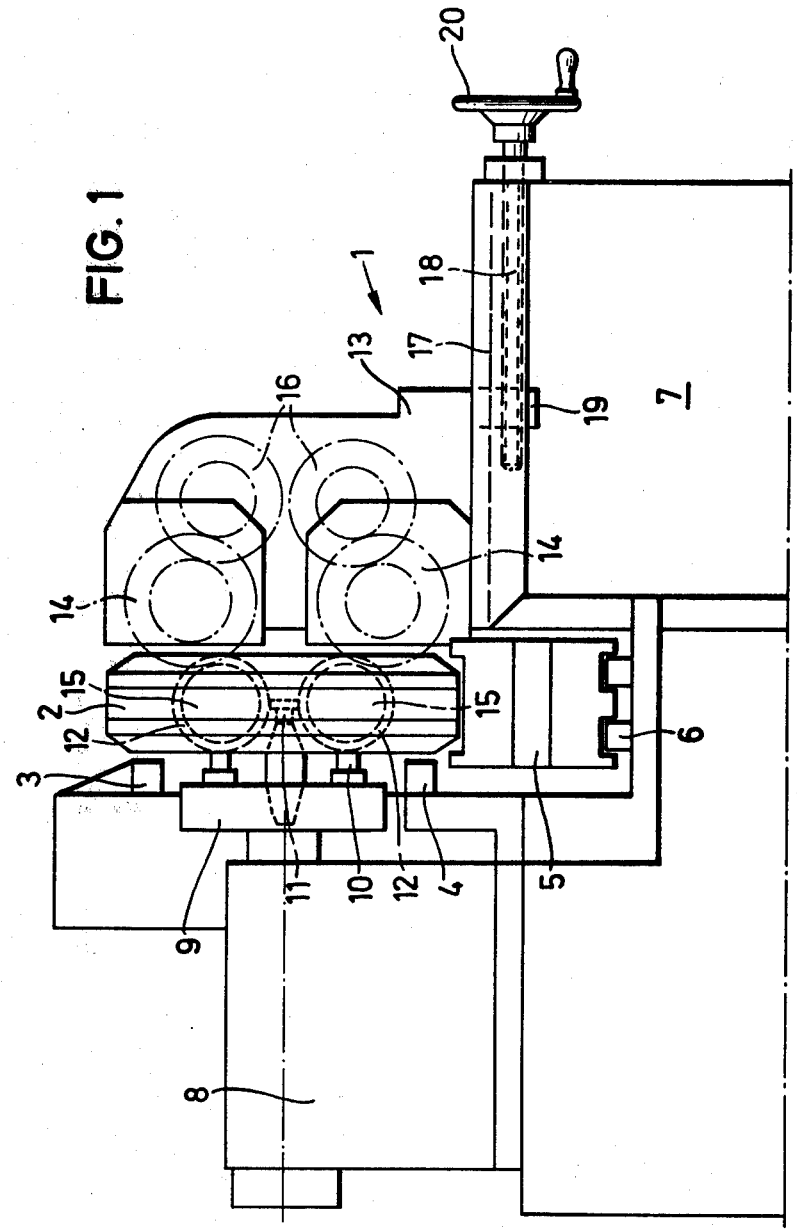
FIG. 1 is a side elevation of a machine with a roll stand in position.

Referring to FIG. 1, a roll turning machine or roll grinding machine, in which a multi-roll stand 2 is inserted, aligned and clamped, is generally designated 1. The roll stand 2 is supported against holders 3 and 4 and stands on a slide 5 which is in turn supported on slideway 6 of the machine frame 7. Other clamping means which are provided for retaining the roll stand 2 have been omitted from the drawings for the purpose of simplifying the illustration.

An adjustable tool support 8 is arranged at one side of the roll stand 2 and has, on a faceplate 9, tools 10 and 11 which machine the working surfaces of the rolls 12.

The roll stand 2 shown in FIG. 1 is a roll stand having four rolls 12, 12a per sizing pass which are offset relative to one another at angles of 90 degrees, only the two rolls 12 having horizontally extending axes being illustrated in FIG. 1. The rolls 12 shown in FIG. 1 are those which are not driven during the actual rolling operation in the rolling mill and which rotate idly. However, when finishing or working-in the sizing pass contour, they have to be driven in order to produce the cutting movement at the tools 10 and 11. The rolls 12 are driven by means of an adjustable drive support 13 which has spur gear wheels 14 meshing with counter-spur wheels 15 which are arranged laterally of and adjacent to the rolls 12 and coaxially therewith and which are directly coupled thereto so as to be non-rotatable relative thereto. Alternatively, the counter-wheels 15 can, for example, only comprise toothed rims which are secured to the rolls 12. The gear wheels 15 are driven by gear wheels 16 in the drive support 13. The latter rests on a slideway 17 of the machine frame 7 where it is adjustable towards and away from the roll stand 2 by means of a hand wheel 20 by way of a screw-threaded spindle 18 and a nut 19, so that the gear wheels 14 can be engaged with and disengaged from the counter-wheels 15.

Figure 2:
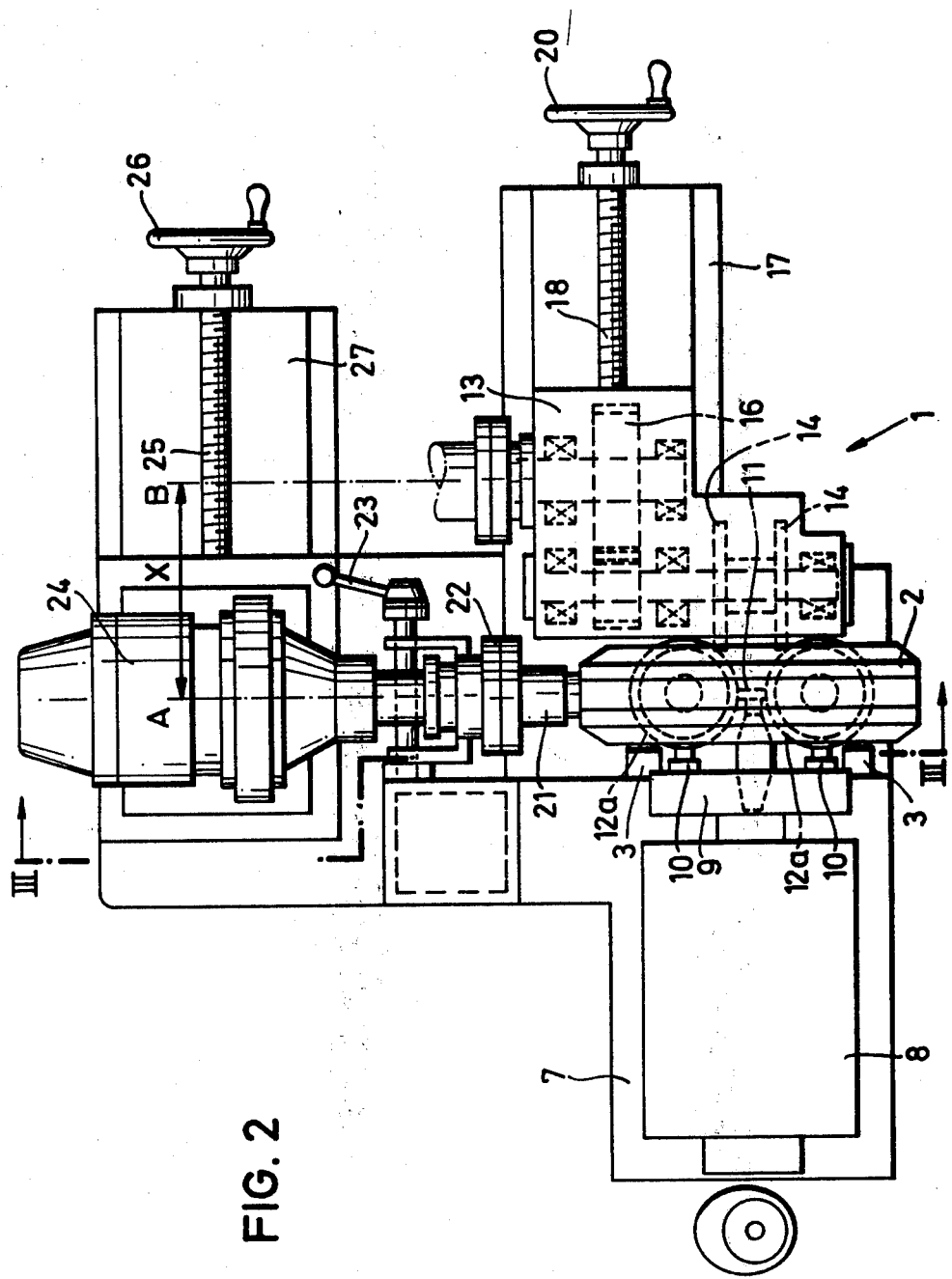
FIG. 2 is a plan view of the machine of FIG. 1.
Figure 3:
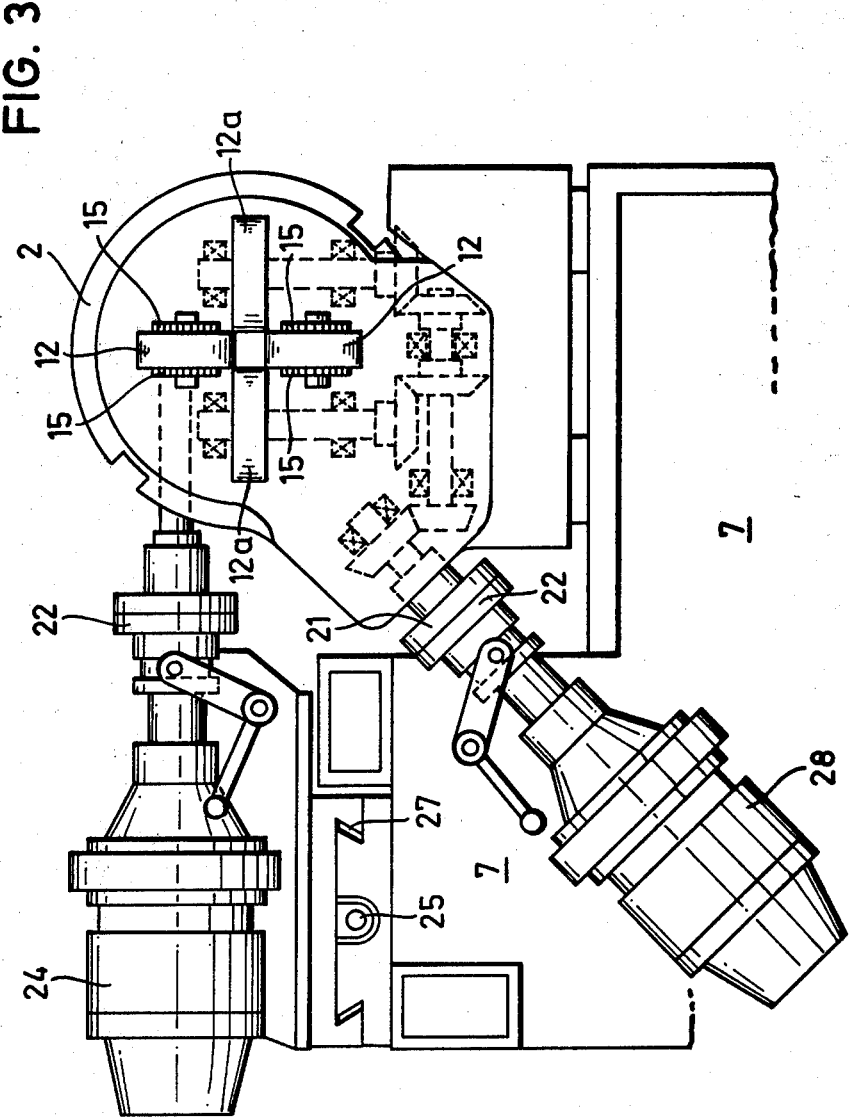
FIG. 3 is a section taken on the line III—III of FIG. 2.

The individual parts shown in FIG. 2 are provided with the same reference numerals as in FIG. 1, although just the other two rolls 12a, whose axes extend vertically, are shown within the roll stand 2. In contrast to the other two rolls 12, the rolls 12a are driven during the rolling operation. They are driven by way of their drive shaft 21 which as shown in FIG. 3, is couplable to a drive unit 28 by way of a clutch 22 which is engageable and disengageable by means of a lever 23. Another drive unit 24 is provided and can be displaced on a slideway 27 from its illustrated position A into position B in the direction of the arrow X by means of a screw-threaded spindle 25 operated by a hand-wheel 26. The drive unit 24 only assumes the position A when a roll stand having a horizontal drive shaft 31 wherein (FIG. 2) is placed on the machine 1, e.g. in the case wherein the roll stand has three rolls. The illustration of FIG. 2, which shows a four-roll stand 2, depicts the situation in which the drive unit 24 is about to be displaced into position B just after the four roll stand 2 has been fitted into position. When in position B, the drive unit 24 is coupled to a drive shaft 34 which drives the gear wheels 16 of the drive support 13 and thus also the gear wheels 14 which, in turn, drive the rolls 12 by way of the counter-wheels 15 (shown only in FIGS. 1 and 3).

The separate drive unit 28 provided for the rolls 12a is shown in FIG. 3 wherein the oppositely located drive unit 24 is also shown. The drive unit 28 is located in the vertical plane of position A and drives the drive shaft 21, and thus the rolls 12a, by way of the clutch 22. This is effected by the same bevel gears and drive shafts in the roll stand 2 which also drive the rolls 12a during the rolling operation.

The drive unit 24, which has already been displaced into position B in FIG. 3, is not connected by means of its clutch 32 to the roll stand 2 but to the drive support 13 (not visible in FIG. 3) located therebehind, and, in the manner described above, drives the two rolls 12. When a roll stand 2 having only three rolls 12 and only one horizontal drive shaft 31 is placed into position, only the drive unit 24 is required and the drive is effected only by means of this drive unit which has then been displaced into position A.

In the foregoing specification I have set out certain perferred practices and embodiments of my invention; however, it will be understood that this invention may be otherwise embodied within the scope of the following claims.

I claim:

1. A roll turning and grinding machine for the finishing and working-in of the sizing pass contour in working rolls of multi-roll stands, having at least one undriven roll which does not have a drive shaft, which machine comprises frame means, means on said frame means for supporting and clamping a roll stand having ready fitted thereon the rolls which require machining and/or grinding, a counter gear on each said undriven roll which does not have a drive shaft, motor driven gear wheels on said frame means arranged to mesh with said counter-gear wheels arranged laterally of and adjacent to said undriven rolls for which the stand is not provided with a drive shaft, said counter-gear wheels being fixed to and non-rotatable relative to their respective rolls, a tool support on said frame and turning and grinding means adjustably supported in said tool support to bring said turning and grinding means into engagement with the rolls peripheries to be machined or ground.

2. A machine as claimed in claim 1, in which the gear wheels and counter-gear wheels have spur teeth.

3. A machine as claimed in claim 1 or 2, in which the motor-driven gear wheels are arranged at that side of the roller stand which is remote from the tool support.

4. A machine as claimed in claim 1 or 2 in which the motor-driven gear wheels are mounted in a drive support which is adjustable relative to the clamped roll stand.

5. A machine as claimed in claim 1 or 2 in which each roll is provided with two counter gears, one on each side thereof, and two driven gear wheels are provided for each roll so as to mesh with said two counter-gears located one at each side of the respective roll.

6. A machine as claimed in claim 4 wherein each roll is provided with two counter-gears, one on each side thereof, and in which two driven gear wheels are provided for each roll so as to mesh with said two counter-gears located one at each side of the respective roll.

7. A machine as claimed in claim 1 or 2 having at least one driven roll mounted on a drive shaft and in which the gear wheels are driven by a drive unit which is displaceably arranged and also selectively engageable with the counter gear and the drive shafts of roll stands provided with said drive shafts.

8. A machine as claimed in claim 4 having at least one drive roll mounted on a drive shaft and in which the gear wheels are driven by a drive unit which is displaceably arranged on the frame and selectively engageable with the counter-gear and the drive shafts of roll stands provided with said shafts.

9. A machine as claimed in claim 5 having at least one driven roll mounted on a drive shaft and in which the gear wheels are driven by a drive unit which is displaceably arranged on the frame and selectively engageable with the counter-gear and the drive shafts of roll stands provided with said shafts.

10. A machine as claimed in claim 6 having at least one driven roll mounted on a drive shaft and in which the gear wheels are driven by a drive unit which is displaceably arranged on the frame and also selectively engageable with the counter-gear and the drive shafts of roll stands provided with said shafts.

11. A machine as claimed in claim 1 or 2 having at least one driven roll mounted on a drive shaft and in which separate drive units are provided for the gear wheels and for the drive shafts of the roll stands.

12. A machine as claimed in claim 4 having at least one driven roll mounted on a drive shaft and in which separate drive units are provided each of which is displaceably arranged and also selectively usable for driving the gear wheels and the drive shafts of roll stands provided with said shafts.

13. A machine as claimed in claim 5 having at least one driven roll mounted on a drive shaft and in which separate drive units are provided each of which is displaceably arranged and also selectively usable for driving one of the gear wheels and the drive shafts of roll stands provided with said shafts.

14. A machine as claimed in claim 6 having at least one driven roll mounted on a drive shaft and in which separate drive units are provided each of which is displaceably arranged and also selectively usable for driving one of the gear wheels and the drive shafts of roll stands provided with said shafts.

* * * * *

UNITED STATES PATENT AND TRADEMARK OFFICE
CERTIFICATE OF CORRECTION

PATENT NO. : 4,251,903
DATED : February 24, 1981
INVENTOR(S) : THEODOR ZACHARIAS It is certified that error appears in the above-identified patent and that said Letters Patent are hereby corrected as shown below:

Column 2, line 25, after "which" --is-- should be inserted.

Signed and Sealed this

Twelfth Day of May 1981

[SEAL]

Attest:

RENE D. TEGTMEYER

Attesting Officer     Acting Commissioner of Patents and Trademarks